(12) United States Patent
Uebbing et al.

(10) Patent No.: US 6,349,159 B1
(45) Date of Patent: Feb. 19, 2002

(54) LENSES THAT LAUNCH HIGH BANDWIDTH MODES INTO A FIBER OPTIC CABLE WHILE ELIMINATING FEEDBACK TO A LASER

(75) Inventors: John Julian Uebbing, Palo Alto, CA (US); Yew Tai Chieng, Singapore (SG)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/388,892

(22) Filed: Sep. 2, 1999

(51) Int. Cl.[7] ................................. G02B 6/42
(52) U.S. Cl. .......................... 385/33; 359/601
(58) Field of Search .................. 385/31, 33, 147; 359/601–613

(56) References Cited

U.S. PATENT DOCUMENTS

| | | | | |
|---|---|---|---|---|
| 4,571,034 A | * | 2/1986 | Nakamura | 358/601 |
| 5,081,639 A | * | 1/1992 | Snyder et al. | 359/708 |
| 5,256,851 A | * | 10/1993 | Presby | 385/33 |
| 6,070,985 A | * | 6/2000 | Riser et al. | 363/552 |

FOREIGN PATENT DOCUMENTS

| | | | | |
|---|---|---|---|---|
| GB | 2188167 | | 9/1987 | |
| GB | 2188167 A | * | 9/1987 | 385/33 |
| JP | 06-342119 | | 12/1994 | |
| JP | 06-342119 | * | 12/1994 | 385/33 |

OTHER PUBLICATIONS

David G. Grier, *Optical Vortices and Optical Wrenches,* http://rainbow.uchicago.edu/~grier/tweezer4b/node9.html, 1997.

* cited by examiner

Primary Examiner—Akm E. Ullah (57) ABSTRACT

A light transmission system includes a laser, an optical fiber and a transfer lens. The fiber optic transfer for transfers light emitted by the laser into the optical fiber. The transfer lens includes a hyperbolic collimating surface for receiving and collimating light originating from the laser. The transfer lens also includes an output lens surface shaped so that light reflected from the end of the optical filter is not focused at a location at which the light is emitted by the laser. Additionally, in various preferred embodiments light launched into the optical fiber avoids index anomalies on the axis of the optical fiber and at the core-cladding interface.

7 Claims, 13 Drawing Sheets

LENSES THAT LAUNCH HIGH BANDWIDTH MODES INTO A FIBER OPTIC CABLE WHILE ELIMINATING FEEDBACK TO A LASER

BACKGROUND

The present invention concerns laser technology and pertains particularly to lenses that launch high bandwidth modes into a fiber optic cable while reducing or eliminating feedback to a laser. A vertical cavity surface emitting laser (VCSEL) emits light in a beam vertically from its surface. Light emitted from an VCSEL is typically focused by a hyperbolic transfer lens (HTL) into an optical fiber and used for transmission of data. Transmission technology such as Gigabit Ethernet technology utilizes VCSELs and multimode fiber optic cabling.

In order to achieve maximum link length, it is desirable that the different fiber modes excited by the laser propagate through a fiber optic cable at the same speed. This allows the light to simultaneously arrive at a destination. However, there are many installed fiber optic cables with various index anomalies that can cause certain bandwidth modes to propagate at speeds different than desired.

SUMMARY OF THE INVENTION

In accordance with the preferred embodiment of the present invention, a light transmission system includes a laser, an optical fiber and a transfer lens. The transfer lens transfers light emitted by the laser into the optical fiber. The transfer lens includes a hyperbolic collimating surface for receiving and collimating light originating from the laser. The transfer lens also includes an output lens surface shaped so that light reflected from the transfer lens is not focused at a location at which the light is emitted by the laser. Additionally, in various preferred embodiments light launched into the optical fiber avoids index anomalies on the axis of the optical fiber and index anomalies at the core cladding interface within the optical fiber.

For example, the laser is a vertical cavity surface emitting laser. The output lens surface can be, for example, a toroidal lens surface, a multiple zone lens surface, a spiral Fresnel lens surface or a spherical lens surface.

In these light transmission systems, optical feedback to the laser is reduced. The various embodiments of the present invention can insure a low coupled power reflected from the end of the optical fiber to the laser sufficient to insure satisfactory operation. The low two pass transmissivity back to the laser of the output lens surface can decrease the feedback power by as much as 25 dB. If too much power is coupled back into the laser from the reflection from the end of the optical fiber, instabilities occur in the laser and the output power oscillates up and down, causing extra and damaging amounts of jitter as the received signal pulses.

DESCRIPTION OF THE PREFERRED EMBODIMENT

Figure 1:
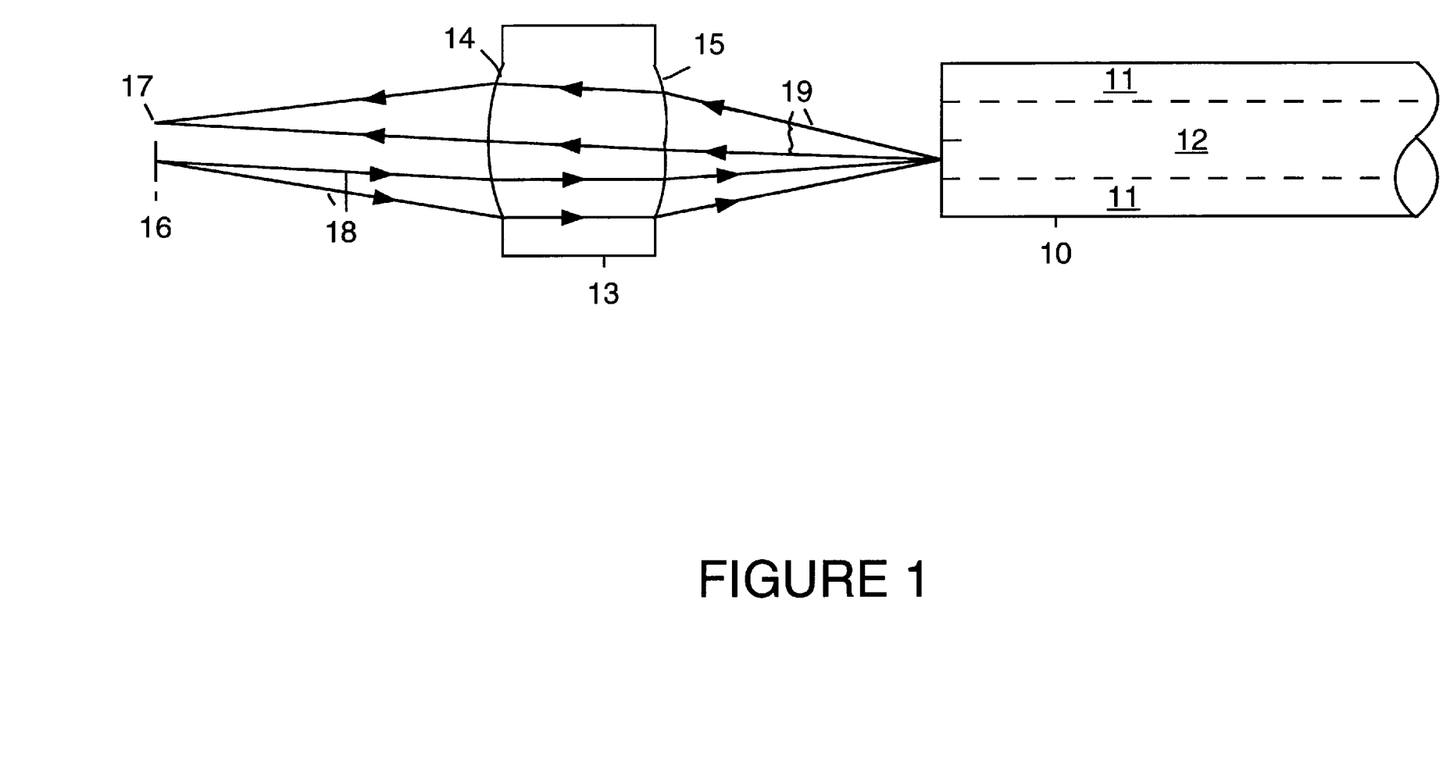
FIG. 1 is a simplified block diagram of a fiber optic coupling lens used to couple light generated by a vertical cavity surface emitting laser (VCSEL) into an optical fiber in accordance with a preferred embodiment of the present invention.

FIG. 1 is a simplified block diagram of a transfer lens 13 used to couple light generated by an emitting surface 16 of a vertical cavity surface emitting laser (VCSEL) into an optical fiber 10. FIG. 1 is meant to be illustrative and is not drawn to scale in the vertical direction. Transfer lens 13 has a hyperbolic collimating lens surface 14 and a toroidal lens surface 15. Optical fiber 10 has a core region 12 and a cladding region 11. Transfer lens 13 is composed of, for example, Ultem plastic.

Light rays 18 represent light rays generated by emitting surface 16 of the VCSEL which are collimated and launched into optical fiber 10 by transfer lens 13. Light rays 19 represent light rays reflected from the surface of optical fiber 10. Only rays launched into one side of the lens are shown for clarity. Rays are actually launched all over the input lens surface.

Transfer lens 13 is shaped to maximize the amount of light generated by emitting surface of the VCSEL which is received into optic fiber 10 by being focused by transfer lens 13. Further, transfer lens 13 is shaped to overcome the existence of various index anomalies within installed optical fibers. The various index anomalies can cause certain modes to propagate at speeds different than desired.

The use of toroidal lens surface 15 gives a conditioned launch to maximize the modal bandwidth and effective link length. The use of toroidal lens surface 15 overcomes a problem with hyperbolic transfer lenses. Particularly, hyperbolic transfer lenses can give such good focusing that when focused, a small fraction of the light generated by VCSEL can return back directly back the light source origin. The use of toroidal lens surface 15 drastically reduces optical feedback.

Toroidal lens surface 15 focuses a point source into a ring. For example, toroidal lens surface 15 takes the light collimated by hyperbolic collimating lens surface 14 and focuses the light into a 25 micrometer diameter ring on the end of optical fiber 10. Because reflected light 19 passes through the opposite side of the lens, the reflected light comes back into a ring of twice the diameter of the ring on optical fiber 10 plus any correction for magnification. For example, with a 1.5:1 magnification on transfer lens 13, the actual diameter of reflected light at emitting surface 16 of the VCSEL is 33 micrometers. The energy returns at a ring (represented in FIG. 1 by a location 17) removed from the emitting surface 16 of the VCSEL, so the mode overlap integral will be small.

Figure 2:
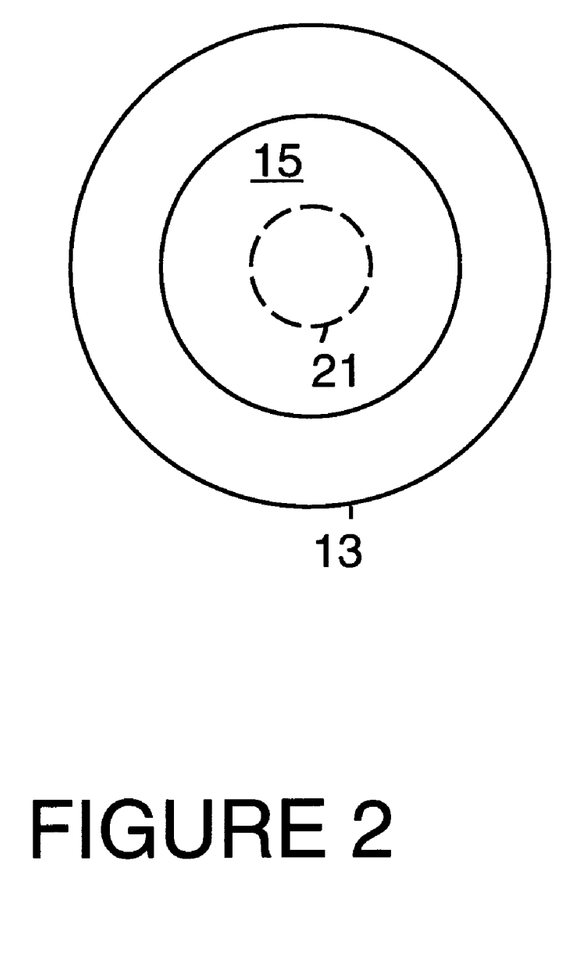
FIG. 2 is a simplified end view of a toroidal lens surface of the fiber optic coupling lens shown in FIG. 1 in accordance with a preferred embodiment of the present invention.

FIG. 2 is a simplified end view of transfer lens 13 and toroidal lens surface 15. Toroidal lens surface 15 shows high points 21

Figure 3:
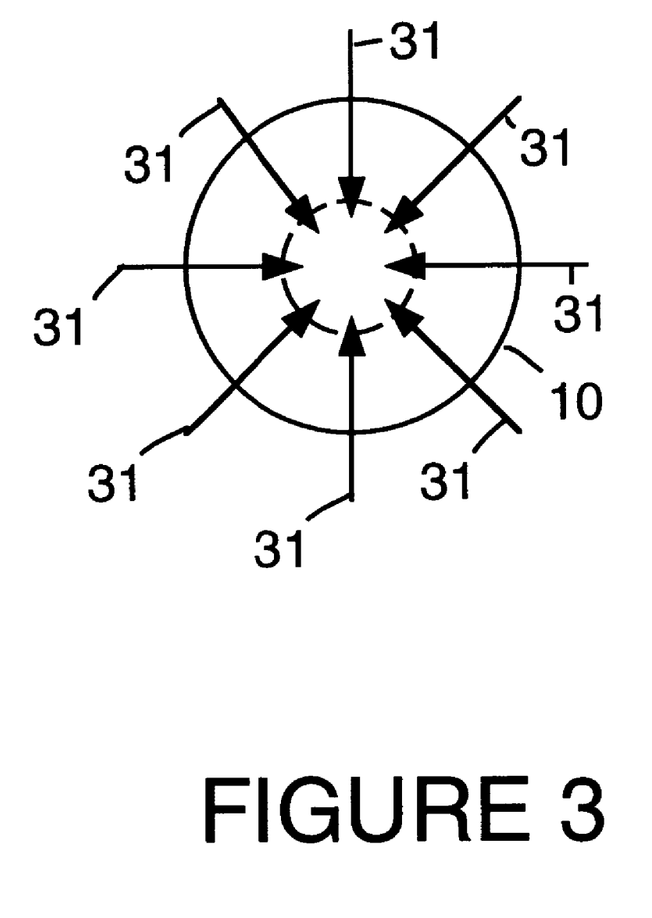
FIG. 3 is a simplified diagram illustrating radial ray paths on an end of the optical fiber shown in FIG. 1 in accordance with a preferred embodiment of the present invention.

FIG. 3 is a simplified diagram illustrating radial ray paths 31 on an end of optical fiber 10.

Figure 4:
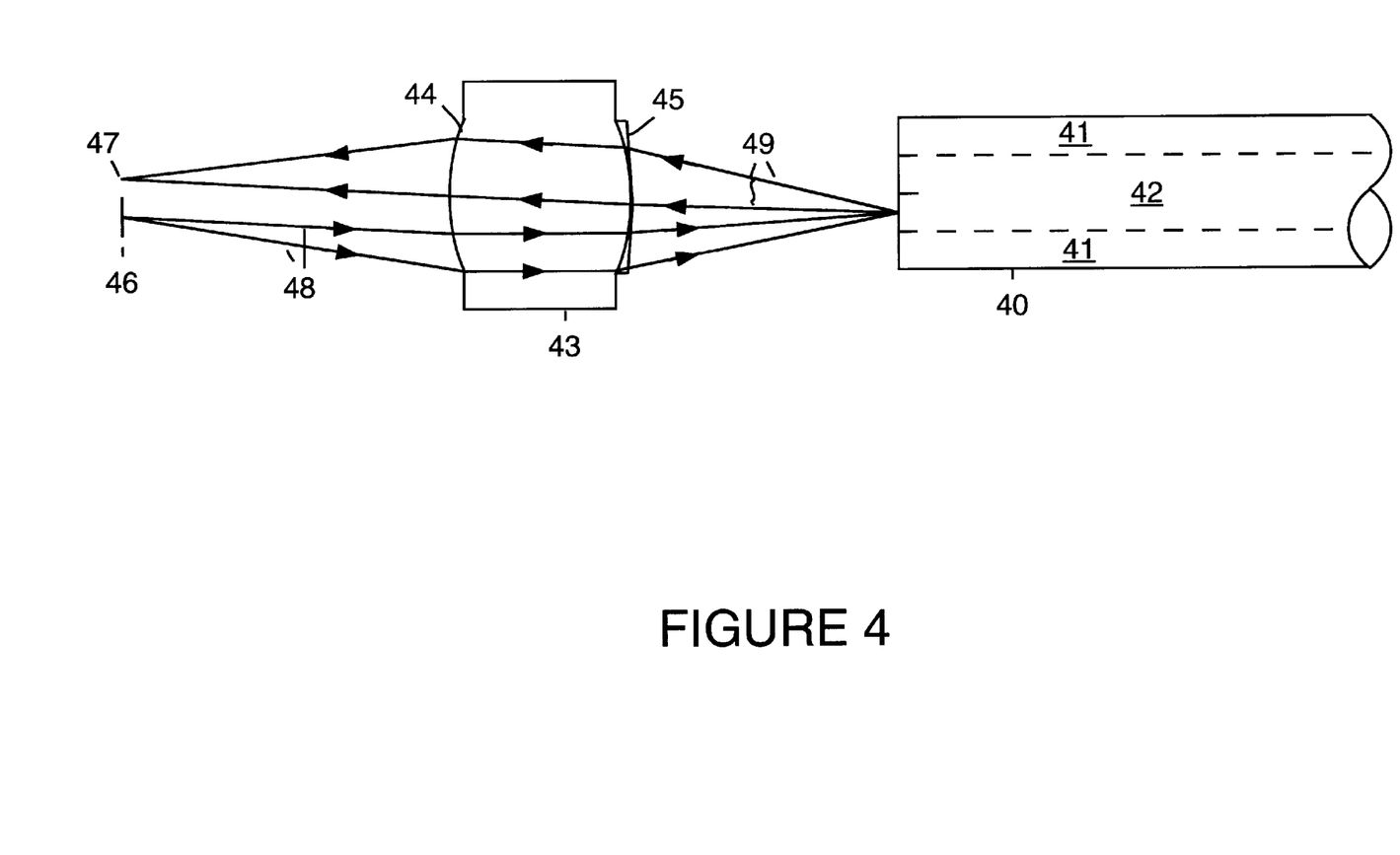
FIG. 4 is a simplified block diagram of a fiber optic coupling lens used to couple light generated by a VCSEL into an optical fiber in accordance with an alternative preferred embodiment of the present invention.

FIG. 4 is a simplified block diagram of a transfer lens 43 used to couple light generated by an emitting surface 46 of a VCSEL into an optical fiber 40. FIG. 4 is meant to be illustrative and is not drawn to scale in the vertical direction. Transfer lens 43 has a hyperbolic collimating lens surface 44 and a four zone lens surface 45. Optical fiber 40 has a core region 42 and a cladding region 41. Transfer lens 43 is composed of, for example, Ultem plastic.

Light rays 48 represent light rays generated by emitting surface 46 of the VCSEL which are focussed and launched into optical fiber 40 by transfer lens 43. Light rays 49 represent light rays reflected from the surface of optical fiber 40 to locations represented by a location 47. For clarity, only rays launched into one side of the lens are shown.

Transfer lens 43 is also shaped to maximize the amount of light generated by the emitting surface of the VCSEL which is received into optical fiber 40. Further, transfer lens 43 also is shaped to overcome the existence of various index anomalies within installed optical fibers. The various index anomalies can cause certain modes to propagate at speeds different than desired.

The use of four zone lens surface 45 takes advantage of the four lobes in the VCSEL radiation pattern. For example, light from each of lobes in the VCSEL radiation pattern is focused onto the end of optical fiber 40 approximately tangent to a 25 micrometer diameter focal ring. Four zone lens surface 45 has four segments, each with their focal points (optical axis) at the approximate tangent point.

For example, transfer lens 43 produces a VCSEL image that is 21 micrometer square. Light will be kept away from the center of optical fiber 40 and so the modal bandwidth will increase.

Figure 5:
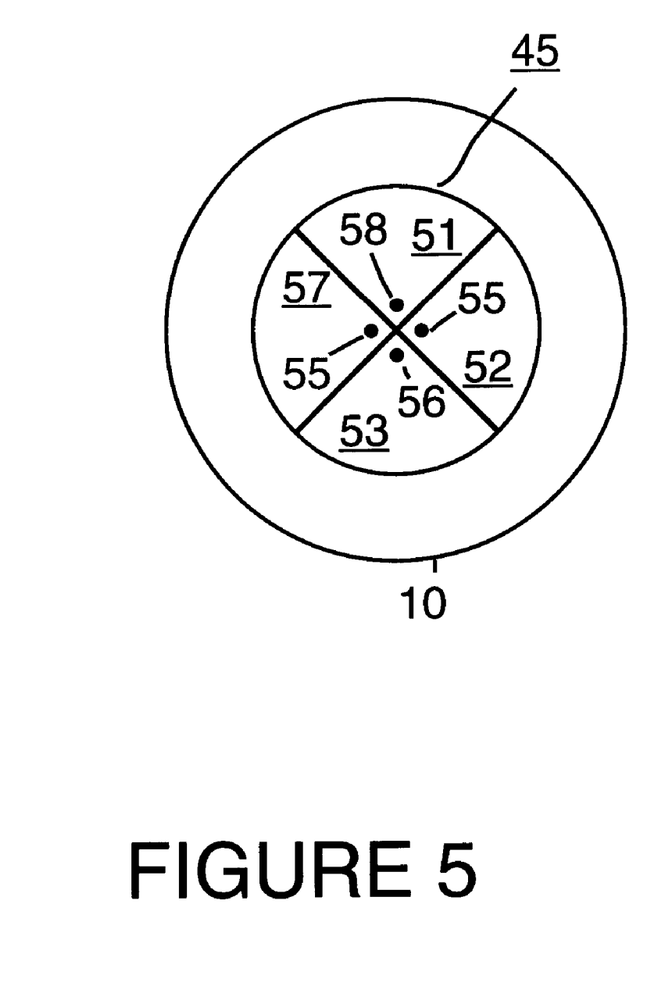
FIG. 5 is a simplified end view of a four zone lens surface of the fiber optic coupling lens shown in FIG. 4 in accordance with a preferred embodiment of the present invention.

FIG. 5 is a simplified end view of transfer lens 43 and four zone lens surface 45. Four zone lens surface 45 has a zone 51, a zone 52, a zone 53 and a zone 54. The optical axis for zone 51 is a point 55 within zone 52. The optical axis for zone 52 is a point 56 within zone 53. The optical axis for zone 53 is a point 57 within zone 54. The optical axis for zone 54 is a point 58 within zone 51.

Figure 6:
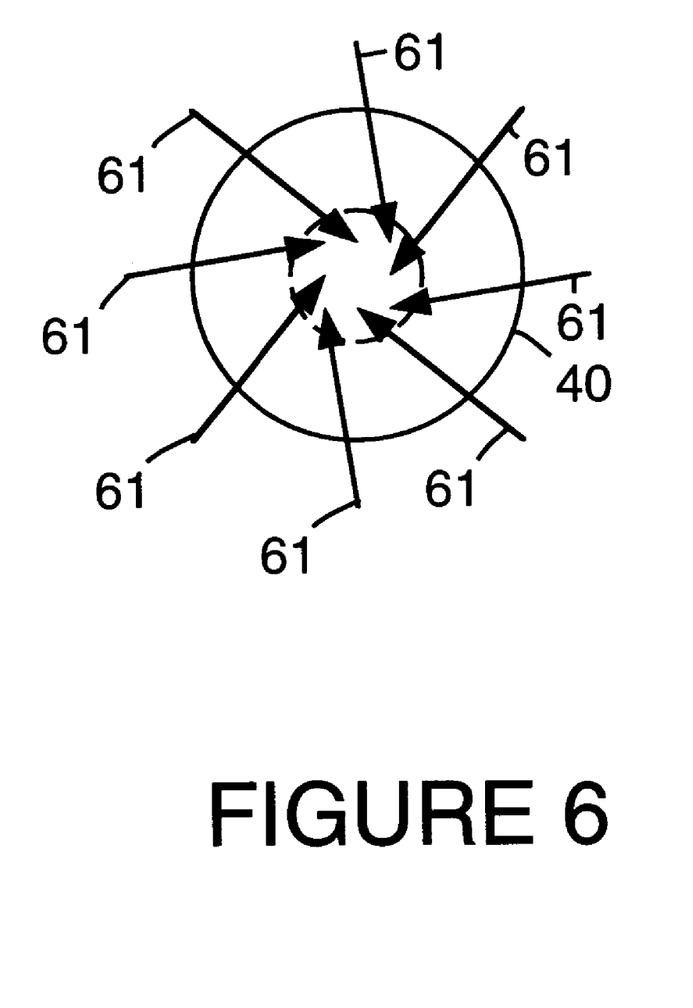
FIG. 6 is a simplified diagram illustrating ray paths on an end of the optical fiber shown in FIG. 4 in accordance with a preferred embodiment of the present invention.

FIG. 6 is a simplified diagram illustrating radial ray paths 61 on an end of optical fiber 40 from a point source laser.

Figure 7:
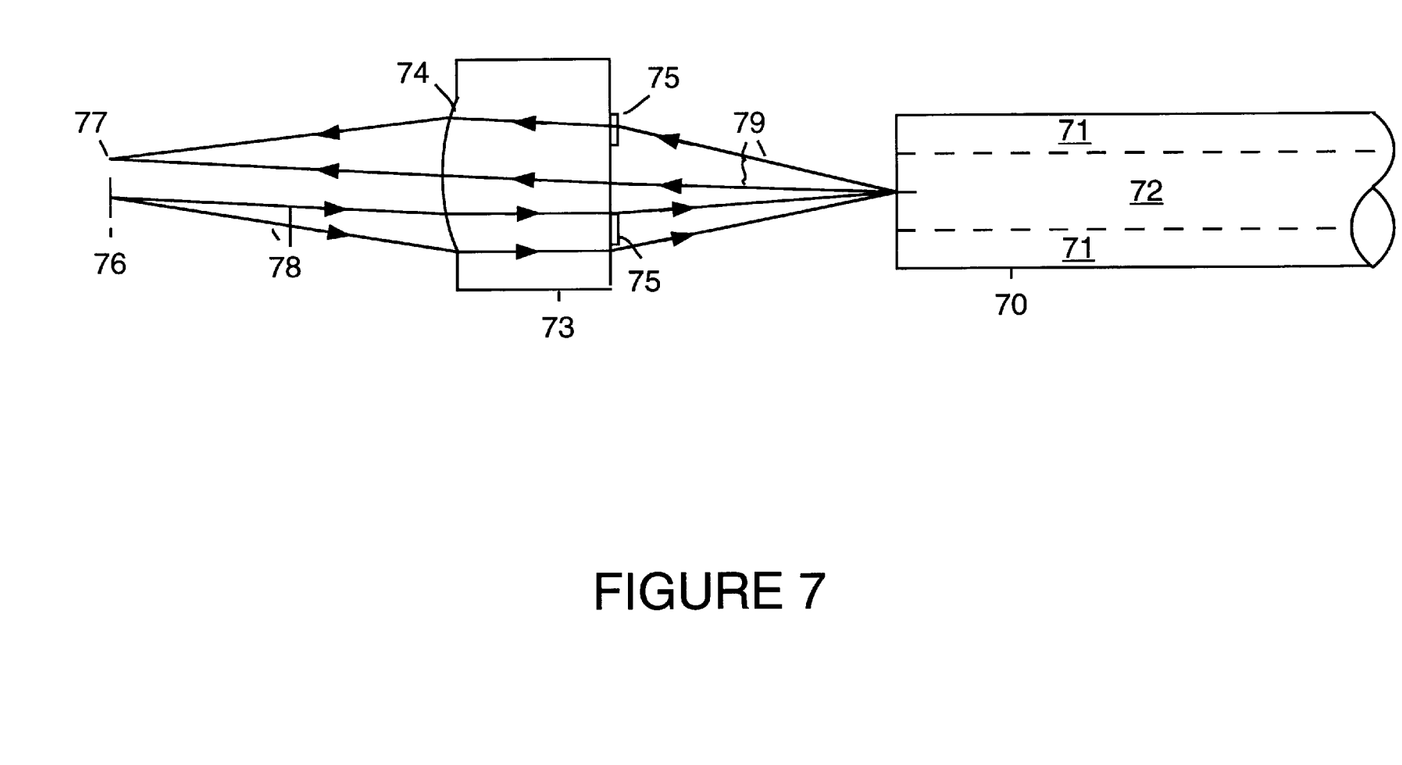
FIG. 7 is a simplified block diagram of a fiber optic coupling lens used to couple light generated by a VCSEL into an optical fiber in accordance with an alternative preferred embodiment of the present invention.

FIG. 7 is a simplified block diagram of a transfer lens 73 used to couple light generated by an emitting surface 76 of a VCSEL into an optical fiber 70. FIG. 7 is meant to be illustrative and is not drawn to scale in the vertical direction. Transfer lens 73 has a hyperbolic collimating lens surface 74 and a spiral Fresnel lens surface 75. Spiral Fresnel lens surface 75 has a spiral grooved shape. Optical fiber 70 has a core region 72 and a cladding region 71. Transfer lens 73 is composed of, for example, Ultem plastic.

Light rays 78 represent light rays generated by emitting surface 76 of the VCSEL which are launched into optical fiber 70 by transfer lens 73. Light rays 79 represent light rays reflected from the surface of optical fiber 70 to locations represented by a location 77. Only one side of the light rays are shown for clarity.

Transfer lens 73 is also shaped to maximize the amount of light generated by emitting surface of the VCSEL which is received into optical fiber 70 and propagated through transfer lens 73. Further, transfer lens 73 also is shaped to overcome the existence of various index anomalies within installed optical fibers. The various index anomalies can cause certain modes to propagate at speeds different than desired.

In one preferred embodiment the depth of the outer groove of the spiral Fresnel lens surface 75 is 28 micrometers. The tolerance on reactive ion etching the mold insert is about 2.5%, so the groove depth variation would be 0.7 micrometer. With an Ultem index of 1.632, this corresponds to a phase error of 0.4 micrometers. This is a large fraction of the 0.85 micrometer operating wavelength. To keep the error down to 0.1 times the wavelength ($\lambda$) the groove depth is 5 micrometer. This corresponds to a depth of 4 $\lambda$. One way of doing this is to split each groove into several small ones, keeping a maximum phase depth of 4 $\lambda$. Alternatively, a new shallow groove can be spawned off from the main groove as the phase depth reaches 4 $\lambda$.

Figure 8:
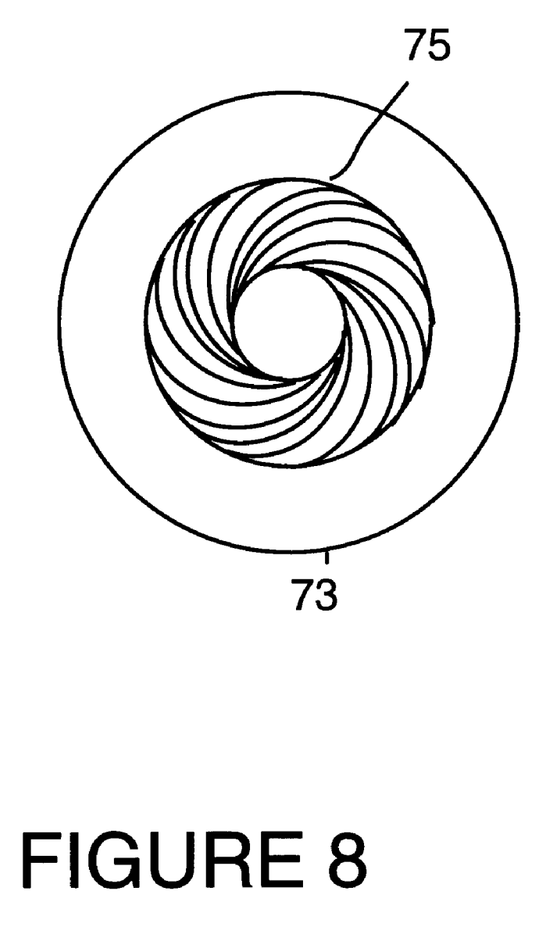
FIG. 8 is a simplified end view of a spiral Fresnel surface of the fiber optic coupling lens shown in FIG. 7 in accordance with a preferred embodiment of the present invention.

FIG. 8 is a simplified end view of transfer lens 73 and spiral Fresnel lens surface 75.

Figure 9:
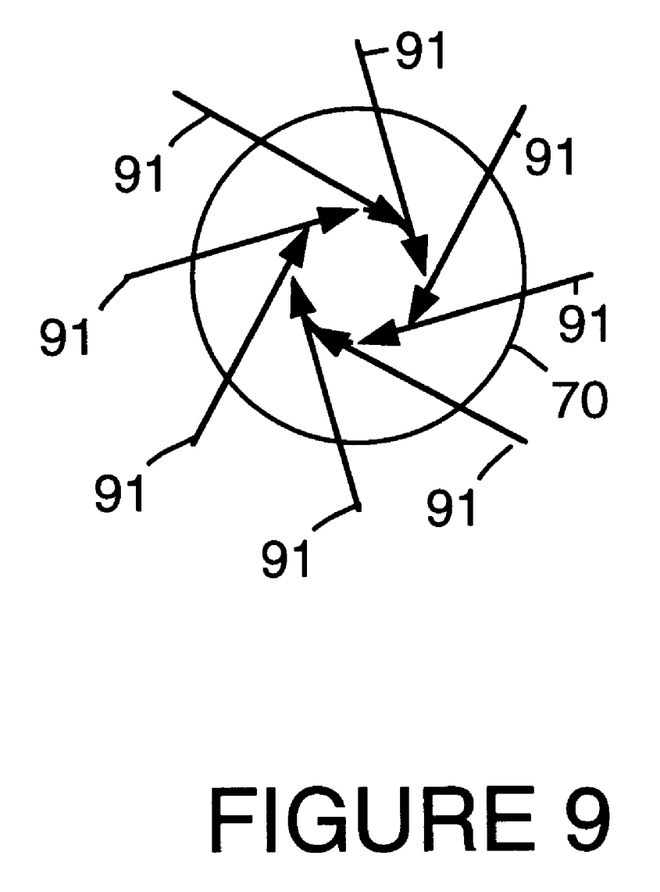
FIG. 9 is a simplified diagram illustrating skew ray paths on an end of the optical fiber shown in FIG. 7 in accordance with a preferred embodiment of the present invention.

FIG. 9 is a simplified diagram illustrating skew ray paths 91 on an end of optical fiber 70 from a point source laser. As can be seen from FIG. 9, spiral Fresnel lens surface 75 launches into optical fiber 70 skew rays, at a tangent and off axis. Skew rays, at a tangent and off axis are very advantageous when launching high modal bandwidth signals in optical fibers with index anomalies at the center and edge. Such rays never see the center or edge of the optical fiber.

Figure 10:
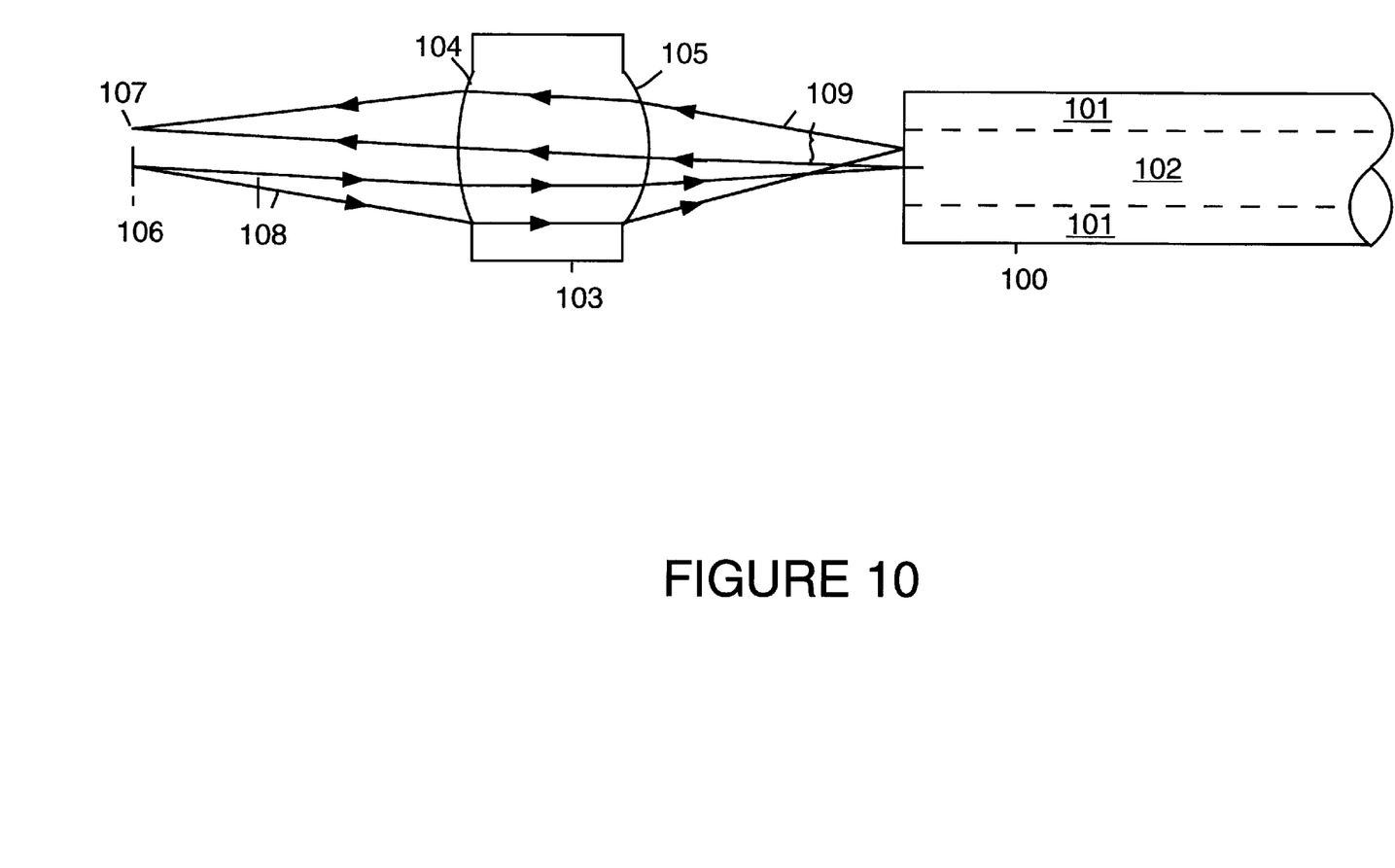
FIG. 10 is a simplified block diagram of a fiber optic coupling lens used to couple light generated by a VCSEL into an optical fiber in accordance with an alternative preferred embodiment of the present invention.

FIG. 10 is a simplified block diagram of a transfer lens 103 used to couple light generated by an emitting surface 106 of a VCSEL into an optical fiber 100. FIG. 10 is meant to be illustrative and is not drawn to scale in the vertical direction. Transfer lens 103 has a hyperbolic collimating lens surface 104 and a spherical lens surface 105. Optical fiber 100 ha s a core region 102 and a cladding region 101. Transfer lens 103 is composed of, for example, Ultem plastic.

Light rays 108 represent light rays generated by emitting surface 106 of the VCSEL which are collimated and launched into optical fiber 100 by transfer lens 103. Light rays 109 represent light rays reflected from the surface of optical fiber 100 to locations represented by a location 107.

Transfer lens 103 is also shaped to maximize the amount of light generated by emitting surface of the VCSEL which is received into optical fiber 100 and propagated through transfer lens 103.

Figure 11:
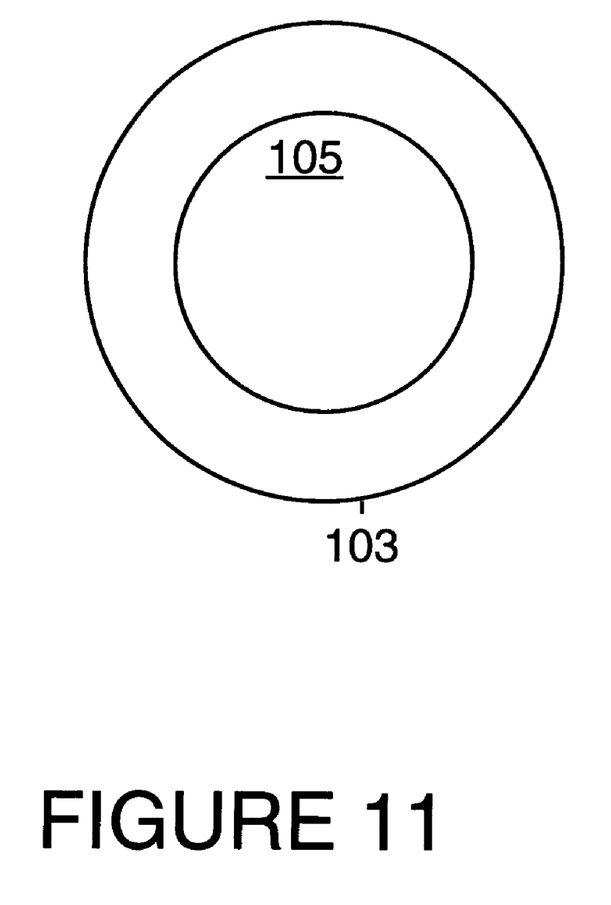
FIG. 11 is a simplified end view of a spherical surface of the fiber optic coupling lens shown in FIG. 10 in accordance with a preferred embodiment of the present invention.

FIG. 11 is a simplified end view of transfer lens 103 and spherical lens surface 105.

Figure 12:
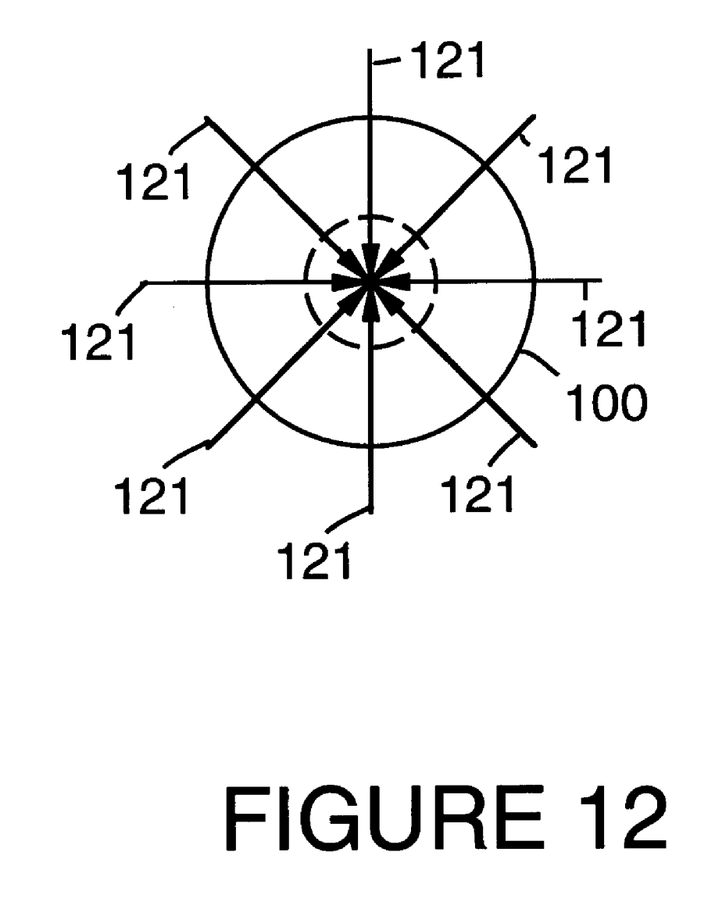
FIG. 12 is a simplified diagram illustrating radial ray paths on an end of the optical fiber shown in FIG. 10 in accordance with a preferred embodiment of the present invention.

FIG. 12 is a simplified diagram illustrating radial ray paths 121 on an end of optical fiber 100 from a point source laser.

In FIG. 10, the location of the hyperbolic collimating lens surface can be exchanged with the location of the spherical lens surface. The resulting illumination gives superior coupling to the optical fiber and reduced coupling back to the VCSEL.

Figure 13:
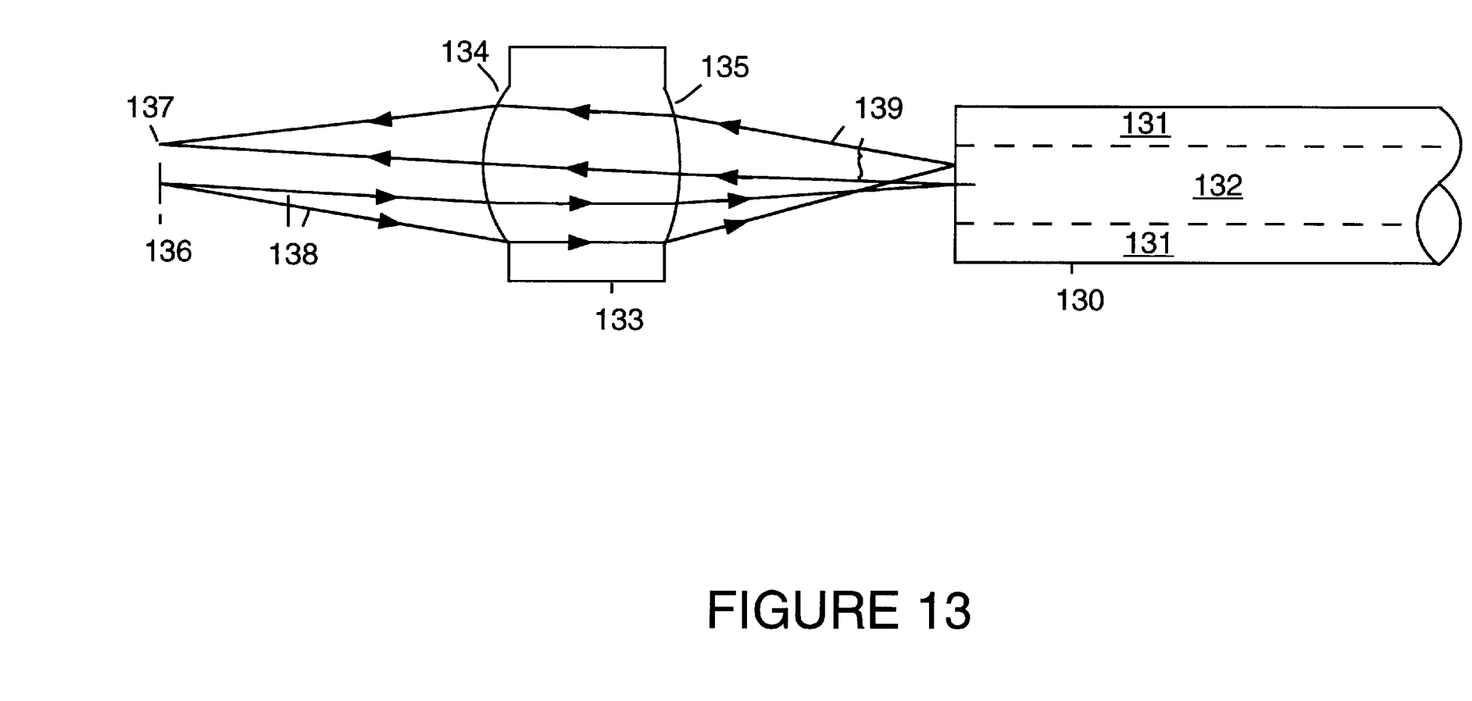
FIG. 13 is a simplified block diagram of a fiber optic coupling lens used to couple light generated by a VCSEL into an optical fiber in accordance with an alternative preferred embodiment of the present invention.

For example, FIG. 13 is a simplified block diagram of a transfer lens 133 used to couple light generated by an emitting surface 136 of a VCSEL into an optical fiber 130. FIG. 13 is meant to be illustrative and is not drawn to scale in the vertical direction. Transfer lens 133 has a spherical lens surface 134 and a hyperbolic lens surface 135. Optical fiber 130 has a core region 132 and a cladding region 131. Transfer lens 133 is composed of, for example, Ultem plastic.

Light rays 138 represent light rays generated by emitting surface 136 of the VCSEL which are launched into optical fiber 130 by transfer lens 133. Light rays 139 represent light rays reflected from the surface of optical fiber 130 to locations represented by a location 137.

Transfer lens 133 is also shaped to maximize the amount of light generated by emitting surface of the VCSEL which is received into optical fiber 130 and propagated through transfer lens 133.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A light transmission system comprising:

a laser;

an optical fiber; and, a transfer lens for transferring light emitted by the laser into the optical fiber, the transfer lens including:

a hyperbolic collimating surface for receiving and collimating light originating from the laser, and an output lens surface shaped so that:

light reflected from the optical fiber back through the transfer lens is not focused at a location at which the light is emitted by the laser, and light launched into the optical fiber is not focused on a center axis of the optical fiber.

2. A light transmission system as in claim 1 wherein the laser is a vertical cavity surface emitting laser.

3. A light transmission system as in claim 1 wherein the output lens surface is also shaped so that light launched into the optical fiber avoids index anomalies on a cladding interface within the optical fiber.

4. A light transmission system as in claim 1 wherein the output lens surface is a toroidal lens surface.

5. A light transmission system as in claim 1 wherein the output lens surface is a multiple zone lens surface.

6. A light transmission system as in claim 1 wherein the output lens surface is a four zone lens surface.

7. A light transmission system as in claim 1 wherein the output lens surface is a spiral Fresnel lens surface.

* * * * *